(12) United States Patent
Haselhorst et al.

(10) Patent No.: US 11,225,286 B2
(45) Date of Patent: Jan. 18, 2022

(54) AUXILIARY FRAME FOR A VEHICLE, IN PARTICULAR AN ELECTRIC VEHICLE

(71) Applicant: Autotech Engineering Deutschland GmbH, Bielefeld (DE)

(72) Inventors: Kai Haselhorst, Versmold (DE); Viktor Friesen, Bielefeld (DE)

(73) Assignee: Autotech Engineering Deutschland GmbH, Bielefeld (DE)

( * ) Notice: Subject to any disclaimer, the term of this patent is extended or adjusted under 35 U.S.C. 154(b) by 177 days.

(21) Appl. No.: 16/749,409

(22) Filed: Jan. 22, 2020

(65) Prior Publication Data
US 2020/0239077 A1 Jul. 30, 2020

(30) Foreign Application Priority Data

Jan. 30, 2019 (DE) ..................... 10 2019 000 648.8
Feb. 8, 2019 (EP) ..................... 19156206

(51) Int. Cl.
*B62D 21/11* (2006.01)
*B62D 21/02* (2006.01)
(Continued)

(52) U.S. Cl.
CPC .............. *B62D 21/11* (2013.01); *B62D 21/02* (2013.01); *B62D 21/155* (2013.01); *B62D 27/02* (2013.01); *B60Y 2200/91* (2013.01)

(58) Field of Classification Search
CPC ...... B62D 21/11; B62D 21/02; B62D 21/155; B62D 27/02; B60Y 2200/91
See application file for complete search history.

(56) References Cited

U.S. PATENT DOCUMENTS

| 2017/0210429 A1* | 7/2017 | Isakiewitsch ........ B62D 25/085 |
| 2017/0240208 A1 | 8/2017 | Sandri et al. |
| 2019/0023322 A1 | 1/2019 | Haselhorst et al. |

FOREIGN PATENT DOCUMENTS

| CN | 2913124 Y | 6/2007 |
| DE | 19922800 A1 * | 11/1999 ........... B62D 29/008 |

(Continued)

*Primary Examiner* — Lori L Lyjak
(74) *Attorney, Agent, or Firm* — The Webb Law Firm

(57) ABSTRACT

The invention relates to an auxiliary frame for a vehicle, in particular an electric vehicle, with a longitudinal member composed of metal sheets, which has bearing connection points for a transverse control arm connection, the bearing connection points being formed in a bearing section of the longitudinal member which is open towards the wheel carrier side, wherein the bearing section is formed from a first single-shell metal sheet and a second single-shell metal sheet, wherein the second single-shell metal sheet is connected to the first single-shell metal sheet by a weld seam, wherein the first single-shell metal sheet has at least one of the bearing connection points, and wherein the second single-shell metal sheet has at least one of the bearing connection points. In order for the auxiliary frame to have a significantly higher stability, in particular higher bending strength and/or rigidity, with the same or only slightly increased weight, the invention provides that the first single-shell metal sheet, when viewed in cross-section, has a substantially Z-shaped shell section which has a profile section facing the wheel carrier side, a profile section facing away from the wheel carrier side and a profile section which connects the two profile sections to one another in one piece and is substantially upright in the assembled state of the auxiliary frame, wherein the weld seam is arranged at a distance from the substantially upright profile section on the profile section facing away from the wheel carrier side.

15 Claims, 6 Drawing Sheets

(51) Int. Cl.
*B62D 21/15* (2006.01)
*B62D 27/02* (2006.01)

(56) References Cited

FOREIGN PATENT DOCUMENTS

| DE | 10109636 A1 * | 9/2002 | ............ B62D 21/11 |
|----|---------------|--------|-------------------------|
| DE | 102012021562 A1 | 5/2014 | |
| DE | 102012111461 A1 | 5/2014 | |
| EP | 1448425 A1 | 8/2004 | |

* cited by examiner

AUXILIARY FRAME FOR A VEHICLE, IN PARTICULAR AN ELECTRIC VEHICLE

CROSS-REFERENCE TO RELATED APPLICATIONS

This application claims priority to German Patent Application No. 10 2019 000 648.8 filed Jan. 30, 2019 and European Patent Application No. 19156206.5 filed Feb. 8, 2019, the disclosures of which are hereby incorporated by reference in their entirety.

BACKGROUND OF THE INVENTION

Field of the Invention

The invention relates to an auxiliary frame, in particular a front axle auxiliary frame, for a vehicle, in particular an electric vehicle, with a longitudinal member composed of metal sheets, which has bearing connection points for a transverse control arm connection, the bearing connection points being formed in a bearing section of the longitudinal member which is open towards the wheel carrier side, wherein the bearing section is formed from a first single-shell metal sheet and a second single-shell metal sheet, wherein the second single-shell metal sheet is connected to the first single-shell metal sheet by means of a weld seam, wherein the first single-shell metal sheet has at least one of the bearing connection points, and wherein the second single-shell metal sheet has at least one of the bearing connection points.

Description of Related Art

Such auxiliary frames, also designated as axle carriers, are known in a variety of embodiments (see e.g. DE 10 2012 021 562 A1 and DE 10 2012 111 461 A1). They are to be as light as possible, with high stability and rigidity, and usually have control arm connections (bearing mounts) for wheel guide elements and other units, in order to enable, as a pre-assembly unit, the installation of complete front or rear axle modules with drive units.

Electric motors of electric vehicles can already emit their maximum torque when the vehicle is at a standstill and therefore, unlike a vehicle drive with an internal combustion engine, they generally do not require a manual gearbox. The high starting torques of electric vehicles require auxiliary frame constructions of particularly stable design, to which the electric motors are fastened for example by means of a cross bridge.

Owing to the relatively low energy density which a rechargeable traction battery (accumulator) offers compared to a tank filled with fuel, electric vehicles are generally distinctly heavier than corresponding vehicles with an internal combustion engine. High vehicle weights produce high effective and dynamic axle loads, which in turn lead to an increased chassis wear.

The use of conventional auxiliary frames for vehicles with combustion engines would therefore lead to component failure in electric motor operation in practice. If the auxiliary frame is incorrectly or inappropriately designed, possible component failure must be expected, in particular at the weld joints, since the weld seams usually have significantly lower strengths than the steel sheet used. In practice, for example, the strength of a conventional single-shell control arm made of a complex-phase steel CP800 with a yield strength of approx. 680 Mpa, which is connected on the vehicle side by means of a horizontal welded-on bearing bush and a vertical pressed-in bearing, is limited by the fatigue strength of the welded connection of the welded-on bearing bush, wherein the fatigue strength is approx. 300 Mpa.

Based thereon, the present invention is based on the problem of creating a auxiliary frame of the type mentioned above, which, with unchanged or only slightly increased weight, has a significantly higher stability, in particular higher bending strength and/or stiffness.

SUMMARY OF THE INVENTION

This problem is solved by an auxiliary frame, according to the invention, which has a longitudinal member composed of metal sheets, and bearing connection points for a transverse control arm connection. The bearing connection points are formed in a bearing section of the longitudinal member which is open towards the wheel carrier side, the bearing section being is formed from a first single-shell metal sheet and a second single-shell metal sheet. The second single-shell metal sheet is connected to the first single-shell metal sheet by means of a weld seam, wherein the first single-shell metal sheet has at least one of the bearing connection points and wherein the second single-shell metal sheet also has at least one of the bearing connection points.

In accordance with the invention, the above-mentioned first single-shell metal sheet, when viewed in cross-section, has a substantially z-shaped shell section, which has a profile section facing the wheel carrier side, a profile section facing away from the wheel carrier side and a profile section which connects the two profile sections to one another in one piece and is substantially upright in the assembled state of the auxiliary frame, the weld seam being arranged at a distance from the substantially upright profile section on the profile section facing away from the wheel carrier side.

Compared to conventional auxiliary frames of the above mentioned type, the auxiliary frame according to the invention is characterized by a higher bending strength and stiffness with unchanged or only slightly increased weight.

The invention is based on the basic idea of solving the above-mentioned strength problem of auxiliary frames for mounting powerful electric motors by means of a load-optimized transverse control arm connection. Due to the high demands on stiffness and strength of the transverse control arm connection of the auxiliary frame, the one or more necessary welding seams near the transverse control arm connection are designed to be as low-stress as possible. For this purpose, the relevant weld seam is arranged or executed as far as possible or sufficiently far away from the force transmission of the transverse control arm connection. The weld seam is thus located in a weakly loaded area, in particular a weakly loaded stress area of the auxiliary frame. In addition, a continuous base material of the auxiliary frame in the immediate vicinity of the transverse control arm connection at the vehicle-side ensures the necessary strength and rigidity of the auxiliary frame. The continuous base material of the auxiliary frame in the immediate vicinity of the transverse control arm connection at the vehicle-side is realized in the auxiliary frame according to the invention by the single-shell metal sheet, which has a substantially z-shaped shell section. This single-shell metal sheet can also be called the main shell of the auxiliary frame or the main shell of the longitudinal member of the auxiliary frame.

The first single-shell metal sheet (main shell) is preferably designed as a drawn part. This enables the substantially Z-shaped shell section to be produced cost-effectively with high dimensional accuracy.

Furthermore, in order to achieve a high stiffness and strength of the transverse control arm connection with an unchanged or only slightly increased weight of the auxiliary frame, it is advantageous if, according to a preferred embodiment of the invention, the first single-shell metal sheet (main shell) extends substantially over the entire length of the longitudinal member. This reduces the number of welding seams and thus the number of possible weak points. This also results in cost advantages in the production of the auxiliary frame.

The substantially upright profile section of the z-shaped shell section of the single-shell metal sheet (main shell) can also be described as a substantially vertical profile section, a vertical Z-profile section or a vertical wall.

An advantageous embodiment of the invention is characterized in that the distance of said weld seam to the substantially upright profile section is at least 3 times, preferably at least 4 times, particularly preferably at least 6 times the sheet thickness of the upright profile section. This allows the occurrence of mechanical stresses in the weld seam to be reduced as far as possible.

For example, the auxiliary frame according to the invention is designed in such a way that the distance between the weld seam and the upright section of the profile is in the range of 10 mm to 30 mm, preferably in the range of 10 mm to 25 mm, particularly preferably in the range of 10 mm to 20 mm.

A preferred embodiment of the auxiliary frame according to the invention is characterized in that the transverse control arm connection, i.e. the connection of the respective transverse control arm is realized by at least two upright transverse control arm bearings. If only upright transverse control arm bearings are used for transverse control arm connection to the longitudinal member, no welded connection is required in the immediate or near vicinity of the transverse control arm connection, thus eliminating the need for welded-on mounting for a horizontal bearing bush.

The upright transverse control arm bearings can, for example, consist of rubber or elastomer bushings connected to the transverse control arm, each of which annularly surrounds a bolt, preferably a screw bolt, connected to two aligned bearing connection points, e.g. through-holes, of the longitudinal member. Accordingly, an advantageous embodiment of the auxiliary frame according to the invention provides that the bearing connection points for the transverse control arm connection are designed in the form of at least two pairs of aligned through-holes, each pair of aligned through-holes defining an upright or substantially vertical connection axis.

The upright profile section of the z-shaped shell section of the longitudinal member enables high forces to be absorbed in the immediate vicinity of the transverse control arm connection and high rigidity values to be achieved. An advantageous embodiment of the invention provides for this purpose that at least two of the bearing connection points are designed in the form of through holes defining an upright or substantially vertical connection axis, the shortest distance of the substantially upright profile section to the connection axis being in a range, whose lower limit corresponds to 2.8 times, preferably 3 times, particularly preferably 3.5 times, the smallest diameter of one or each of the through holes and whose upper limit corresponds to 5 times, preferably 4.5 times, particularly preferably 4.2 times, the smallest diameter of one or each of the through holes.

For example, the auxiliary frame according to the invention is designed in such a way that the shortest distance of the substantially upright profile section to the connection axis is in a range of 40 mm to 80 mm, preferably in a range of 50 mm to 70 mm. Instead of the connection axis, the outer diameter of the upright transverse control arm bearing can also be selected as the reference point for measuring the shortest distance of the substantially upright profile section. In relation to the outside diameter of the upright transverse control arm bearing, the shortest distance of the substantially upright profile section is, for example, in the range of 20 mm to 40 mm, preferably in the range of 25 mm to 35 mm.

A further advantageous embodiment of the invention is characterized in that the profile section facing away from the wheel carrier side has a plane connecting section where the weld seam is designed as a substantially plane weld seam. This embodiment also helps to reduce mechanical stresses in the weld seam.

According to another advantageous embodiment, the weld is an exposed weld, preferably an exposed fillet weld on a lap joint. In other words, the weld seam is not covered by attachments. The weld seam thus remains clearly visible on the finished auxiliary frame. This "visibility" leads to manufacturing advantages in the context of quality control.

The second single-shell metal sheet, which together with the main shell delimits the bearing section for the transverse control arm connection of the longitudinal member open towards the wheel carrier side, preferably extends (only) over a partial length of the longitudinal member. This embodiment has a favourable effect with regard to a low weight of the auxiliary frame. The second single-shell metal sheet is preferably arranged or welded to the underside of the first single-shell metal sheet. This favours the design of the weld seam as an exposed weld seam and thus the "visibility" of the weld seam.

A further embodiment of the auxiliary frame according to the invention is characterized in that at least one add-on part from a group comprising a cross member, a steering protection, a connecting tower and/or a bracket plate is attached, preferably welded, to the z-shaped shell section. The z-shaped shell section thus serves to accommodate at least one such add-on part (attachment). This allows the stiffness and strength of the transverse control arm connection to be further improved while the weight of the auxiliary frame remains unchanged or increases only slightly.

According to another embodiment of the invention, a third single-shell metal sheet is arranged on the upper side of the first single-shell metal sheet, which is connected to the first single-shell metal sheet (main shell) by means of at least two weld seams. This embodiment can also further improve the stiffness and strength of the transverse control arm connection while keeping the weight of the auxiliary frame unchanged or only slightly increased. Preferably, at least one or at least two of the weld seams are designed as substantially plane weld seams. This embodiment in turn contributes to the reduction of mechanical stresses in the weld seam concerned.

The auxiliary frame according to the invention preferably has no or almost no concealed welding seams. All essential attachments can be placed on top of the main shell and welded to it.

The auxiliary frame according to the invention offers a high degree of integration possibilities for various functions, because many connection points can be integrated in one component (shell element) or a few components (shell elements) of the auxiliary frame according to the invention. In particular, low manufacturing tolerances can be achieved relatively easily with the auxiliary frame according to the invention, since all essential connection points can be integrated in a single part (shell element).

Another advantageous embodiment of the auxiliary frame according to the invention is characterized in that the first single-shell metal sheet (main shell) is made in one piece with a section of a cross member. This results in a higher level of functional integration. In particular, this embodiment allows the number of individual parts of the auxiliary frame to be reduced, thus saving production costs. Even greater functional integration can be achieved if, in accordance with an alternative optional embodiment of the auxiliary frame according to the invention, the first single-shell metal sheet is made in one piece with a corresponding, substantially mirror-symmetrical, single-shell metal sheet of a second longitudinal member. In particular, this results in a large single-shell component or a large main shell, which has two substantially z-shaped shell sections on the outer sides of the longitudinal beam sections. This embodiment offers particular advantages in terms of production costs.

BRIEF DESCRIPTION OF THE DRAWINGS

In the following, the invention is explained in further detail with the aid of drawings illustrating an example embodiment. There are shown.

DESCRIPTION OF THE INVENTION

Figure 1:
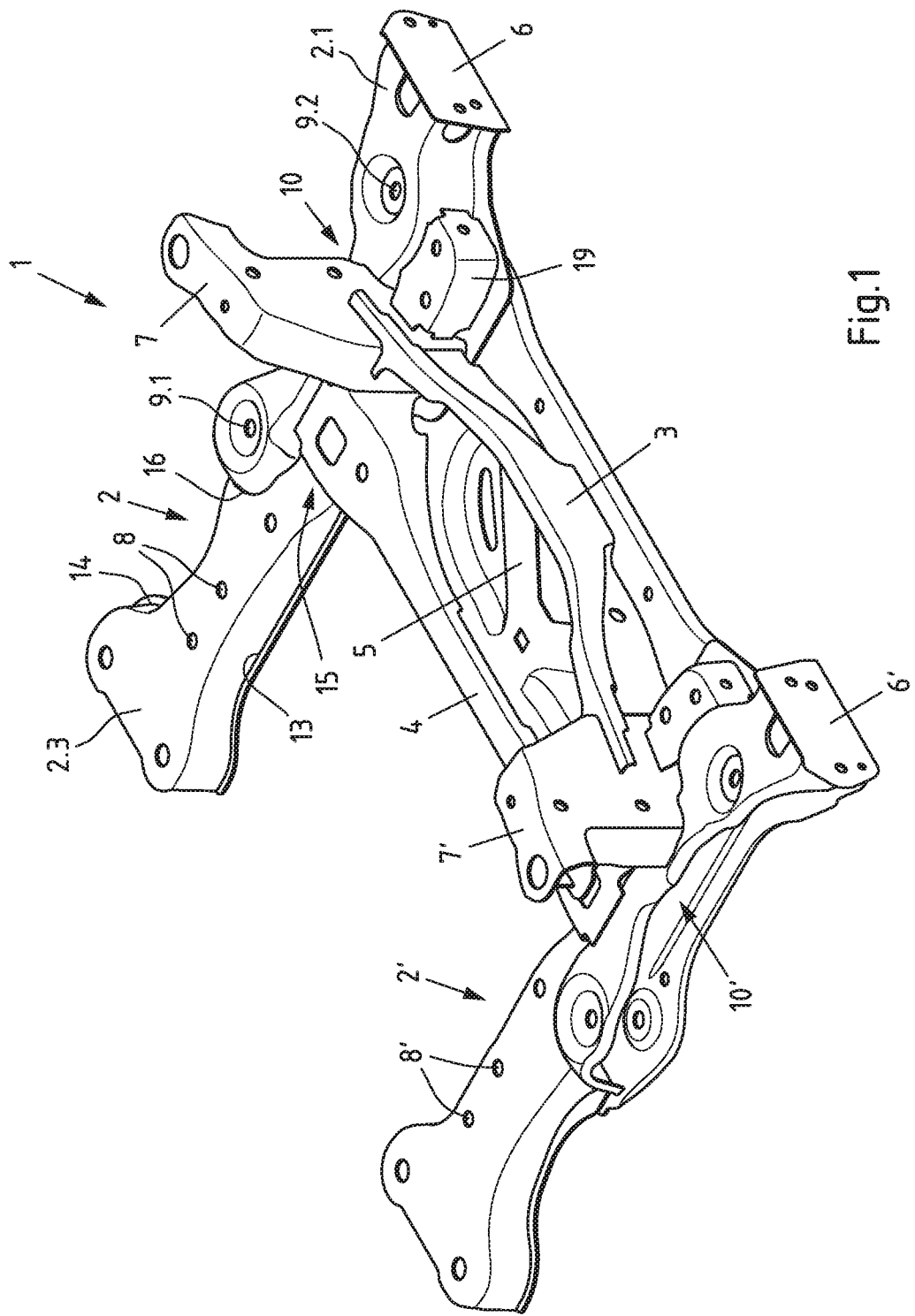
FIG. 1 an auxiliary frame for a vehicle, in particular an electric vehicle, with bearing sections open towards the wheel carrier side for connecting transverse control arms, in a perspective view.

FIG. 1 shows an auxiliary frame 1 for a motor vehicle, especially an electric vehicle. Auxiliary frame 1, which here is designed as a front axle auxiliary frame, for example, is made up of longitudinal and cross members. The term "longitudinal member" is used here to mean supporting elements or sections of supporting elements of the auxiliary frame which, when auxiliary frame 1 is mounted, extend substantially along the longitudinal axis of the motor vehicle concerned. The cross members, on the other hand, extend substantially transversely to the longitudinal axis of the vehicle when auxiliary frame 1 is mounted.

The longitudinal members and cross members are made of metal sheets (sheet metal shells). FIG. 1 shows in particular a left longitudinal member 2, a right longitudinal member 2', a front cross member 3 and an upper shell 4 serving as a cross member. Furthermore, a sheet metal shell 5 serving as steering protection, crash absorber connection plates 6, 6' and so-called tower shells 7, 7', which serve to connect auxiliary frame 1 to the vehicle body, can also be seen. In addition, auxiliary frame 1 is provided with at least one transverse bridge (not shown here), which is attached to the longitudinal members 2, 2' by means of screw connections at connection holes 8, 8'. The transverse bridge is used to support a vehicle drive unit, for example an electric motor. Alternatively, a combustion—engine or a gearbox can be mounted on the transverse bridge.

The respective longitudinal member 2, 2' is composed of metal sheets (sheet metal shells). It comprises bearing connection points 9.1, 9.2 for a transverse control arm connection. The bearing connection points 9.1, 9.2 are formed in a bearing section 10, 10' of the respective longitudinal member 2, 2' which is open towards the wheel carrier side (FIG. 1). The bearing section 10 on the left longitudinal member 2 is made of a first single-shell metal sheet 2.1 and a second single-shell metal sheet 2.2. The metal sheet 2.2 is located on the underside of the metal sheet 2.1 (see FIGS. 4a and 5b).

Figure 2:
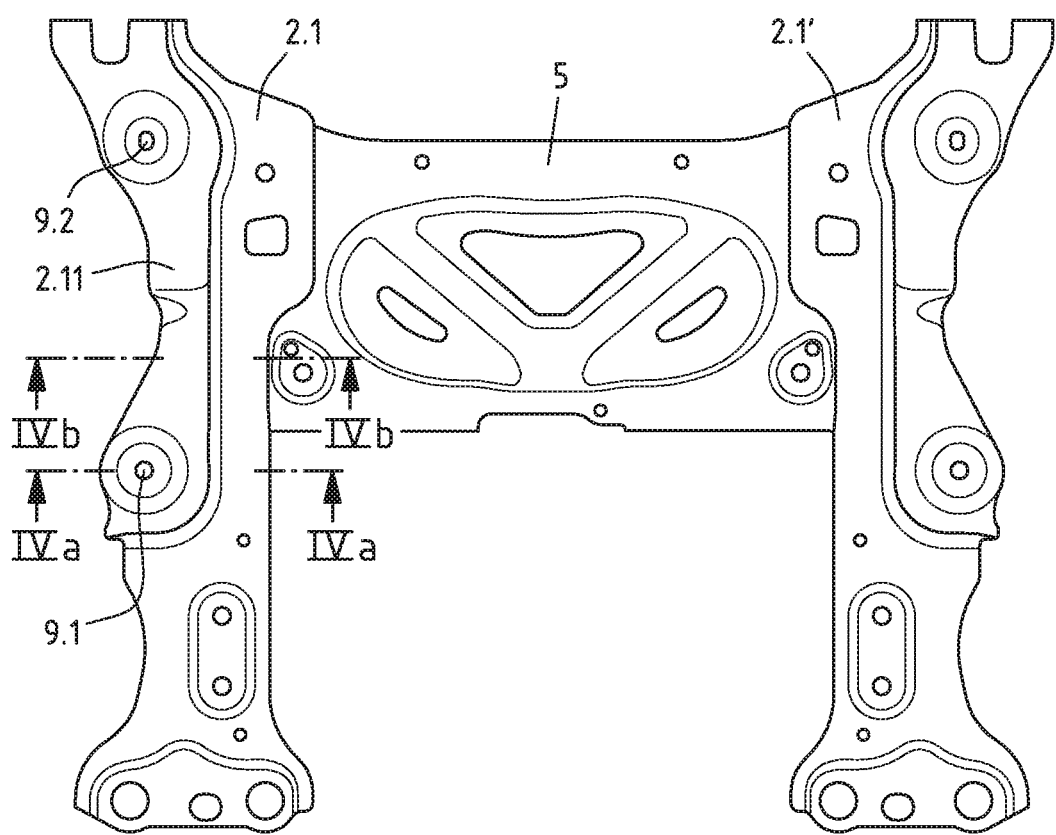
FIG. 2 a top view of interconnected sheet metal parts of an auxiliary frame as shown in FIG. 1 in a prefabrication stage.

The two single-shell metal sheets 2.1, 2.2 are joined together by means of a weld seam 11. The first metal sheet 2.1 may also be referred to as the main shell and the second metal sheet 2.2 as the lower shell or cover sheet. The first metal sheet (main shell) 2.1 is designed as a drawn part and preferably extends substantially over the entire length of the longitudinal member 2 (see FIGS. 1 and 2). The second metal sheet (cover sheet) 2.2 extends over a part of the length of the longitudinal member 2 and begins or ends, like the metal sheet 2.1, preferably at the front end of the longitudinal member 2 or immediately behind the crash absorber connection plate 6.

Figure 3:
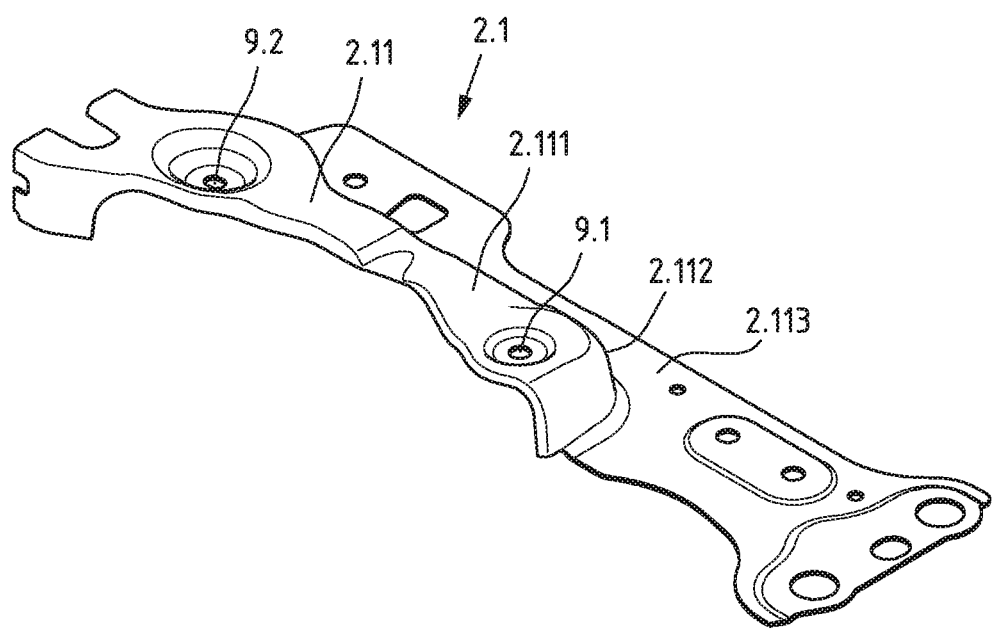
FIG. 3 the upper left, single-shell metal sheet of the component group shown in FIG. 2, which has a substantially z-shaped shell section, in a perspective view.
Figure 4A:
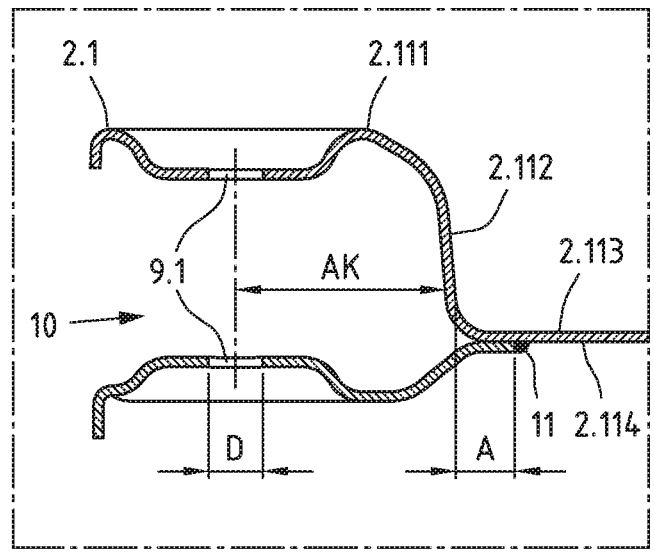
FIGS. 4a and 4b cross-sectional views of the component group shown in FIG. 2 along the section lines IVa-IVa and IVb-IVb in FIG. 2.
Figure 4B:
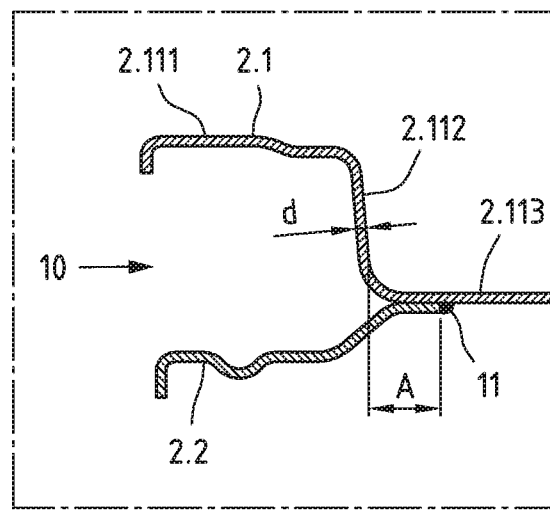
Figure 5B:
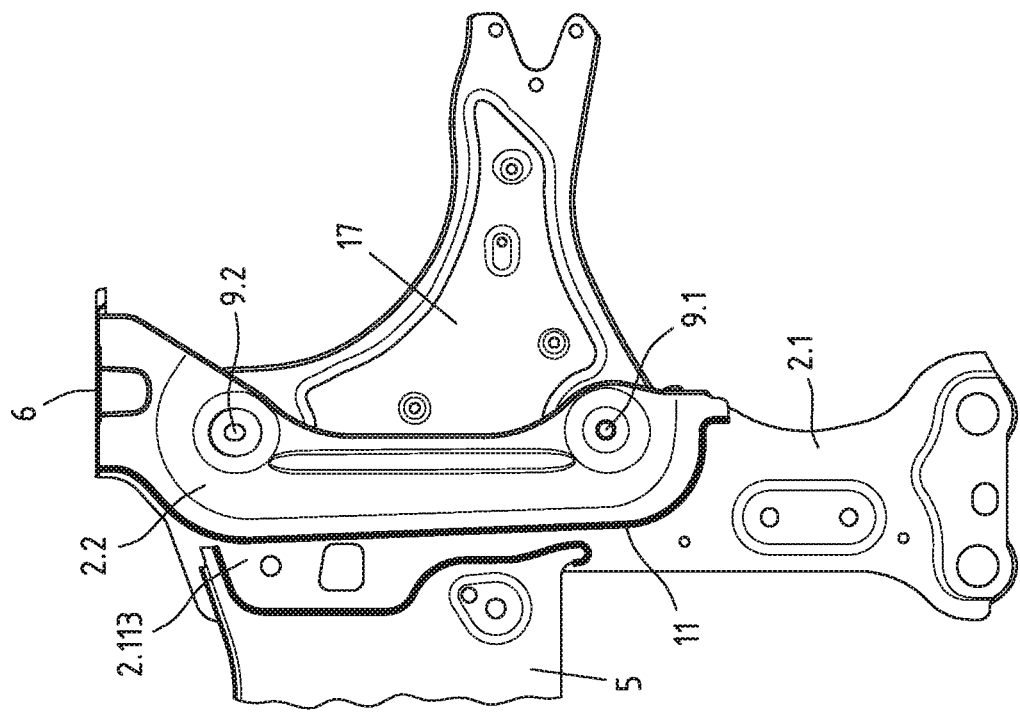
FIGS. 5a and 5b a section of the component group according to FIG. 2 with the upper left-sided single-shell metal sheet in a bottom view, wherein a transverse control arm is inserted into the bearing section for connecting a transverse control arm (FIG. 5a) or the bearing section is covered by a second single-shell metal which is welded to the upper single-shell metal sheet (FIG. 5b)
Figure 5A:
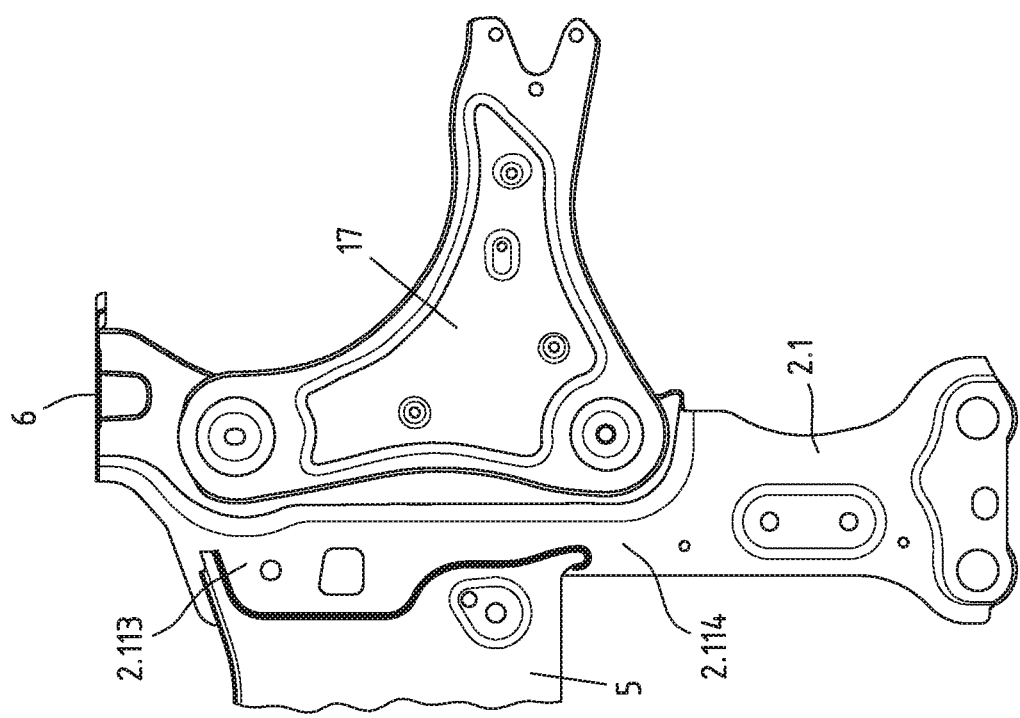
Figure 6:
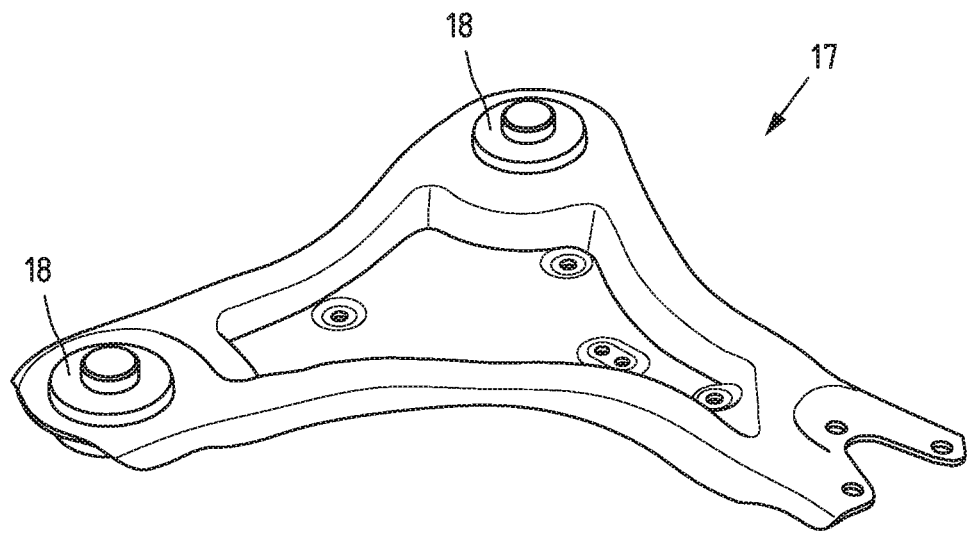
FIG. 6 the transverse control arm from FIGS. 5a and 5b in a perspective view.

The first metal sheet (main shell) 2.1 has, viewed in cross-section, a substantially z-shaped shell section 2.11 which has a profile section 2.111 facing the wheel carrier side, a profile section 2.113 facing away from the wheel carrier side and a profile section 2.112 which connects the two profile sections 2.111, 2.113 to each other in one piece and is substantially upright in the assembled state of auxiliary frame 1 (cf. in particular FIGS. 3, 4a and 4b). The weld seam 11, by means of which the second metal sheet (cover sheet) 2.2 is connected to the first metal sheet 2.1, is arranged at a distance (A) from the substantially upright profile section 2.112 on the profile section 2.113 facing away from the wheel carrier side. Weld seam 11 is located in a weakly loaded area of auxiliary frame 1.

The profile section 2.113 of sheet metal 2.1 facing away from the wheel carrier side preferably has a flat connecting section 2.114, on which weld seam 11 is executed as a flat weld. Furthermore, weld seam 11 is not covered by attachments. Weld 11 is thus executed as an exposed weld, preferably as an exposed fillet weld on an overlap joint defined by the two metal sheets 2.1, 2.2.

The distance between weld seam 11 and the upright profile section 2.112, for example, is at least 3 times, preferably at least 4 times, and particularly preferably at least 6 times the sheet thickness d of the upright profile section 2.112. The sheet thickness d of the profile section 2.112, for example, can be in the range of 1.8 mm to 3.5 mm, and in particular in the range of 2.0 mm to 3.0 mm. The distance A of weld seam 11 to the upright profile section 2.112, for example, is in the range of 10 mm to 30 mm, preferably in the range of 10 mm to 20 mm.

The bearing connection points 9.1, 9.2 for a transverse control arm connection are formed on the first metal sheet 2.1 and on the second metal sheet 2.2. Preferably the bearing connection points 9.1, 9.2 for the transverse control arm connection are designed in the form of at least two pairs of aligned through holes, each pair of aligned through holes defining an upright or substantially vertical connection axis (transverse control arm connection axis) 12. The through-holes of at least one of the pairs are preferably elongated holes. In particular in FIGS. 1 and 2 it can be seen that the longitudinal axis of the elongated holes is substantially parallel to the longitudinal axis of the respective longitudinal member 2 or parallel to a straight line connecting the front and rear bearing connection points 9.1, 9.2.

For example, the shortest distance Ak of the substantially upright profile section 2.112 of the shell section 2.11 to the upright or substantially vertical transverse control arm connection axis 12 is in a range whose lower limit corresponds to 2.8 times, preferably 3 times, particularly preferably 3.5 times, the smallest diameter D of one or each of the two through holes, while the upper limit of this distance range corresponds to 5 times, preferably 4.5 times, particularly preferably 4.2 times, the smallest diameter D of one or each of the two through holes.

In addition, the longitudinal member 2 may comprise at least one further or third single sheet metal sheet 2.3 located on the upper surface of the first sheet metal sheet 2.1 and defining a cavity with the latter. The metal sheet 2.3 can also be described as the upper shell. It is rigidly connected to the first metal sheet 2.1, for example by at least two weld seams 13, 14, preferably at least one of these weld seams is a substantially flat weld seam. The third metal sheet (upper shell) 2.3 extends, for example, from the rear end of the longitudinal member 2 or first metal sheet 2.1 facing away from the crash absorber connection plate 6 or from the rear end of the longitudinal member 2 or first metal sheet 2.1 to the rear cross member 4 and is preferably connected both to the cross member 4 and to the z-shaped shell section 2.11 of the metal sheet 2.1 by means of arc-shaped or non-planar weld seams 15, 16.

The upright profile section 2.112 of the z-profile shell section 2.10 of the longitudinal member 2 allows high forces to be absorbed and high auxiliary frame rigidity to be achieved in the immediate vicinity of the bearing connection of the transverse control arm 17, which in this case is preferably in the form of a screw connection of rubber or elastomer bushings 18. In particular, the z-profile shell section 2.11 makes it possible to avoid a critical weld seam in the area of an upright profile section close to the transverse control arm connection, which is loaded there by high stresses that occur during the drive of an electric vehicle, and to move the weld seam inwards to the lower profile section 2.113 of the z-profile shellsection 2.11 facing away from the wheel carrier side. In addition, the z-shaped shell section 2.11 serves to hold attachments such as a cross member 3, 4, steering—protection 5, a connecting tower 7 and/or a bracket sheet 19.

The metal sheets (metal shells) 2.1, 2.2, 2.3 are preferably made of sheet steel and preferably have different sheet thicknesses and/or different material grades, in particular yield strengths and tensile strengths. For example, the metal sheet (top shell) 2.3 may have a lower sheet thickness than the metal sheet (main shell) 2.1.

The embodiment of the invention is not limited to the examples illustrated in the drawings. Rather, the invention comprises further embodiment variants, which also make use of the invention, indicated in the enclosed claims, in a configuration deviating from the examples shown. For example, the first metal sheet 2.1 may be a single piece with a section of a central component such as a cross-member or steering protection 5. It is also within the scope of the present invention to make the first single-shell metal sheet 2.1 in one piece with a corresponding, substantially mirror-symmetrical, single-shell metal sheet 2.1' of the second longitudinal member 2'.

The invention claimed is:

1. An auxiliary frame, especially front axle auxiliary frame, for a vehicle, especially an electric vehicle, with
a longitudinal member composed of metal sheets, which has bearing connection points for a transverse control arm connection,
wherein the bearing connection points are formed in a bearing section of the longitudinal member which is open towards the wheel carrier side,
wherein the bearing section is formed from a first single-shell metal sheet and a second single-shell metal sheet,
wherein the second single-shell metal sheet is connected to the first single-shell metal sheet by means of a weld seam,
wherein the first single-shell metal sheet has at least one of the bearing connection points and
wherein the second single-shell metal sheet has at least one of the bearing connection points,
characterised in that
the first single-shell metal sheet, when viewed in cross-section, has a substantially Z-shaped shell section which has a profile section facing the wheel carrier side, a profile section facing away from the wheel carrier side and a profile section which connects the two profile sections to one another in one piece and is substantially upright in the assembled state of the auxiliary frame,
wherein the weld seam is arranged at a distance from the substantially upright profile section on the profile section facing away from the wheel carrier side.

2. The auxiliary frame according to claim 1, characterised in that the distance of the weld seam from the substantially upright profile section is at least 3 times, preferably at least 4 times, particularly preferably at least 6 times the sheet thickness of the upright profile section.

3. The auxiliary frame according to claim 1, characterised in that at least two of the bearing connection points are in the form of through holes defining an upright or substantially vertical connection axis, the shortest distance of the substantially upright profile section to the connection axis is in a range whose lower limit corresponds to 2.8 times, preferably 3 times, particularly preferably 3.5 times, the smallest diameter of one or each of the through holes and whose upper limit corresponds to 5 times, preferably 4.5 times, particularly preferably 4.2 times, the smallest diameter of one or each of the through holes.

4. The auxiliary frame according to claim 1, characterized in that the profile section facing away from the wheel carrier side has a plane connecting section on which the weld seam is designed as a substantially plane weld seam.

5. The auxiliary frame according to claim 1, characterized in that the weld seam is designed as an exposed weld seam, preferably as an exposed fillet weld seam on an overlap joint.

6. The auxiliary frame according to claim 1, characterized in that the first single-shell metal sheet is designed as a drawn part.

7. The auxiliary frame according to claim 1, characterized in that the first single-shell metal sheet extends substantially over the entire length of the longitudinal member.

8. The auxiliary frame according to claim 1, characterized in that the second single-shell metal sheet extends over a partial length of the longitudinal member.

9. The auxiliary frame according to claim 1, characterized in that the bearing connection points for the transverse control arm connection are designed in the form of at least two pairs of aligned through holes, each pair of aligned through holes defining an upright or substantially vertical connection axis.

10. The auxiliary frame according to claim 1, characterized in that at least one add-on part from a group comprising a cross member, a steering guard, a connecting tower and/or a bracket plate is attached, preferably welded, to the Z-shaped shell section.

11. The auxiliary frame according to claim 1, characterized in that the second single-shell metal sheet is arranged on the underside of the first single-shell metal sheet.

12. The auxiliary frame according to claim 1, characterized in that a third single-shell metal sheet is arranged on the upper side of the first single-shell metal sheet and is connected to the first single-shell metal sheet by means of at least two weld seams.

13. The auxiliary frame according to claim 12, characterized in that at least one or at least two of the weld seams are designed as substantially plane weld seams.

14. The auxiliary frame according to claim 1, characterized in that the first single-shell metal sheet is made in one piece with a section of a cross member or a sheet serving as steering protection.

15. The auxiliary frame according to claim 1, characterized in that the first single-shell metal sheet is made in one piece with a corresponding single-shell metal sheet of a second longitudinal member.

* * * * *